April 28, 1959  W. P. MERRILL  2,883,859
OPERATING MECHANISM FOR A PIPE TESTING MACHINE
Filed Sept. 17, 1956  2 Sheets-Sheet 1
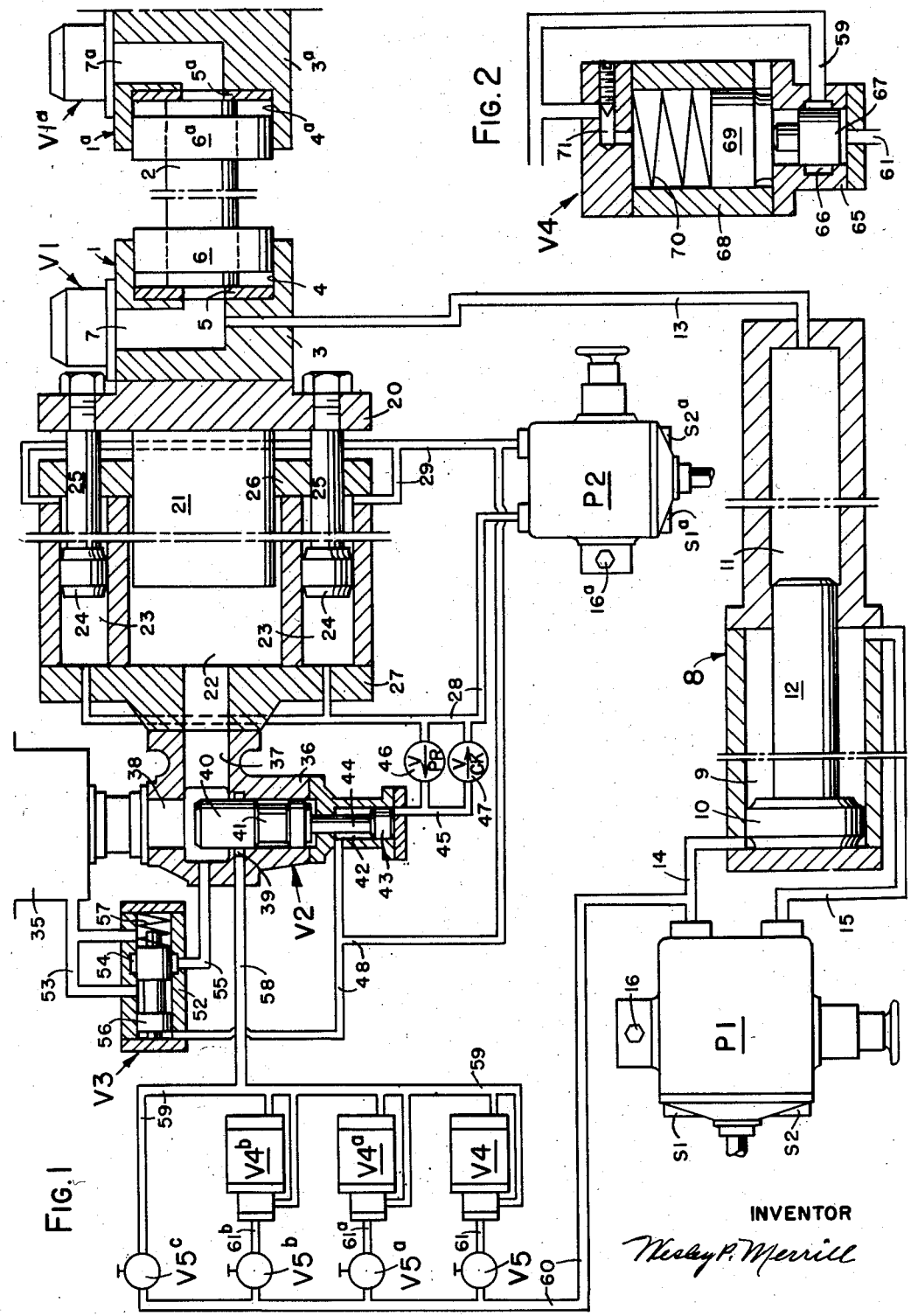
INVENTOR
Wesley P. Merrill INVENTOR
Wesley P. Merrill United States Patent Office 2,883,859
Patented Apr. 28, 1959

2,883,859

OPERATING MECHANISM FOR A PIPE TESTING MACHINE

Wesley P. Merrill, Wauwatosa, Wis., assignor to The Oilgear Company, Milwaukee, Wis., a corporation of Wisconsin Application September 17, 1956, Serial No. 610,365

15 Claims. (Cl. 73—49.6)

This invention relates to pipe testing machines of the type having a movable head and a stationary head for supporting opposite ends of a length of pipe which is to be tested, means for sealing the pipe in the heads, hydraulic means for moving the movable head toward and from the pipe and for holding it firmly against the pipe during testing, means for prefilling the pipe with water and means for supplying water at high pressure to the pipe to test it.

The testing pressure causes the water in the pipe to exert a "blow-off" force which tends to move the movable head away from the pipe but at the same time the hydraulic means exerts a "hold-up" force which opposes the blow-off force. The testing pressure also causes the pipe to expand radially which causes the pipe to shorten with the result that the pipe would move out of contact with one or both heads if no means were provided to advance the movable head as the pipe shortens.

Pipes of different diameters and of different lengths are tested on the same machine. Some pipes have thin walls as they need to withstand only moderate pressures while other pipes of the same diameter have thick walls as they must withstand very high pressures. If the hold-up force should exceed the blow-off force by too great an amount, a thin-walled pipe might collapse and a long pipe would bow or buckle. The blow-off force will vary with the diameter of the pipe and with the pressures at which it is tested. Therefore, the hold-up force must be regulated in accordance with the cross-sectional area of the pipe and the testing pressure.

Several types of pipe testing machines have been produced but none is entirely satisfactory. One of the better known machines has its movable head operated by hydraulic means which is energized by a "constant pressure pump." That is, a pump which will discharge liquid at a predetermined maximum rate until the pressure created by the pump reaches a predetermined maximum and then the pump will automatically reduce its displacement until it is discharging just enough liquid to maintain that maximum pressure constant. The pump is adjusted to maintain a constant pressure high enough to enable the hydraulic means to exert a hold-up force somewhat higher than the blow-off force.

One of the principal objections to a machine of that type is that the pump must be adjusted each time a different size of pipe is to be tested or the same size of pipe is to be tested at a different pressure and in order to adjust the pump it is necessary to calculate the pump pressure required to enable the hydraulic means to exert the proper hold-up force for each size of pipe at each pressure at which pipes of that size are to be tested.

In another well-known machine, the movable head is moved against the end of the pipe by hydraulic means which then exerts sufficient force to old the head against the pipe and shortening of the pipe due to the testing pressure causes additional liquid to be supplied to the hydraulic means to enable the same to advance the head against the end of the pipe. The objections to this machine are similar to the objections to the machine mentioned above and, in addition, the pipe has to shorten before the head is moved, thereby causing the pipe to move through the sealing means and wear it out rapidly.

The present invention has as an object to provide a pipe testing machine with an operating mechanism which is free from the above-mentioned objectionable characteristics.

Another object is to provide a pipe testing machine with operating mechanism which requires but one adjustment for each size of pipe and one regulation of the pressure at which any size of pipe is to be tested.

A pipe testing machine provided with operating mechanism constructed according to the invention has the advantage that it can be operated by a relatively unskilled operator.

According to the invention in its principle aspect, the movable head is urged against the end of the pipe by a substantially constant force and the blow-off force is opposed by a force which is nearly the same as the blow-off force.

The invention is exemplified by the operating mechanism shown schematically in the accompanying drawings in which the views are as follows:

Fig. 1 is a diagram of the hydraulic circuit of a pipe testing machine which is provided with operating mechanism constructed according to the present invention.

Fig. 2 is a sectional view illustrating the function of one of the pressure reducing valves shown in Fig. 1.

Figure 3:
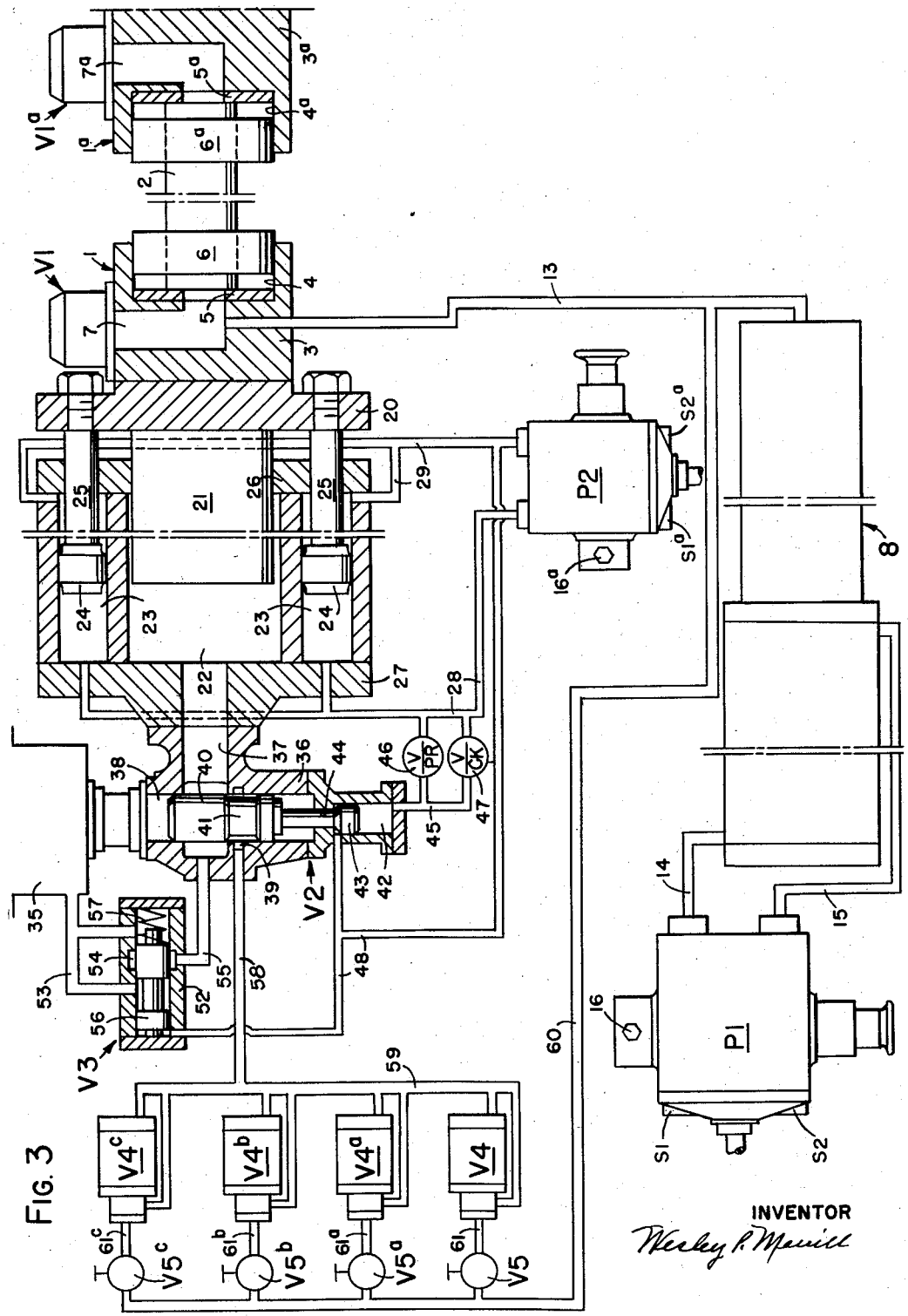
Fig. 3 is a view similar to Fig. 1 but illustrating a modification of the invention.

Referring first to Fig. 1, the invention has been shown incorporated in an operating mechanism for a pipe testing machine of which only so much has been illustrated as is necessary to an explanation of the operating mechanism because the machine per se forms no part of the present invention.

The machine includes a movable head 1 and a stationary head 1ᵃ for supporting opposite ends of a pipe 2 to be tested. Head 1ᵃ is fixed in adjusted positions upon a frame (not shown) and head 1 is slideably mounted upon that frame. Head 1 includes a body 3 having a recess or socket 4 formed therein, an abutment 5 arranged at the inner end of socket 4 to be engaged by the end of pipe 2, and a sealing device 6 arranged in socket 4 to provide a liquid tight seal between pipe 2 and body 3. In order to provide for flow of test water into and out of pipe 2, a passage 7 extends through body 3 and abutment 5 into communication with the interior of pipe 2. Head 1ᵃ has been shown as being the same as head 1 and like parts have been indicated by like reference numerals with the exponent "a" added to the reference numerals applied to head 1ᵃ.

If the ends of the pipes to be tested were uniform and normal to the pipe axis, abutments 5 and 5ᵃ could be made of resilient sealing material and sealing devices 6 and 6ᵃ could be omitted when the machine is provided with operating mechanism constructed according to the present invention.

Passages 7 and 7ᵃ communicate, respectively, with two valves V1 and V1ᵃ one of which is a prefill valve through which water at a low pressure is supplied to pipe 2 to fill it and the other of which is a vent valve which permits air and water to escape from pipe 2 until pipe 2 is completely filled with water and then the valve closes. After the pipe is completely filled and the vent and prefill valves are closed, water at testing pressure is supplied to the pipe through one or the other of the two heads.

Water at testing pressure is provided by an intensifier 8 shown as comprising a stationary operating cylinder 9 having a piston 10 fitted therein, a pressure cylinder 11 which is smaller in diameter than cylinder 9 and is fixed thereto, and a plunger 12 which is fixed to piston 10 and extends into cylinder 11. Intensifier 8 may be connected to the interior of pipe 2 through either of the heads but for the purpose of illustration cylinder 11 has been shown connected by a channel 13 to the passage 7 in which case valve V1 is a prefill valve and valve V1a is a vent valve. If channel 13 is connected to head 1 which is movable, it must be provided with extendable joints or be made at least in part of high pressure hose.

In order to simplify the drawing, intensifier 8 has been shown as being energized by motive liquid, which usually is a mineral oil, supplied thereto by a single pump P1 which has its opposite sides connected to opposite ends of cylinder 11 by channels 14 and 15, respectively, but it is common practice to provide large machines with a plurality of pumps and to connect the pumps to the intensifier in parallel with each other.

Pump P1 is a reversible "constant pressure" pump which is well known and has been in extensive commercial use for many years. It is deemed sufficient to state herein that the maximum pressure which the pump can create in channel 14 is determined by adjustment of a pressure regulating screw 16, that the pump is controlled by two solenoids S1 and S2, that pump displacement is zero when both solenoids are de-energized, that energizing solenoid S1 causes pump P1 to discharge liquid through channel 14 to the pressure end of cylinder 9 at a predetermined maximum rate until pump pressure reaches a maximum as determined by the adjustment of screw 16 and then the pump will automatically reduce its displacement until it is discharging just enough liquid to maintain that maximum pressure constant, and that pump P1 will discharge liquid at a predetermined rate through channel 15 to the return end of cylinder 9 when solenoid S1 is de-energized and solenoid S2 is energized.

The testing machine as thus far described is constructed according to common practice and no part of the invention resides therein.

Movable head 1 is adapted to be moved toward and from pipe 2 and to be firmly held against the end of pipe 2 by hydraulic means. As shown, head 1 is fixed to a crosshead 20 having a ram 21 fixed thereto and extending into a stationary cylinder 22. Movement of head 1 toward and from pipe 2 is effected by two hydraulic jacks each comprising a stationary cylinder 23 and a piston 24 which is fitted in cylinder 23 and is connected to crosshead 20 by a rod 25. In practice, ram 21 and rod 25 extend through individual glands which prevent escape of liquid from the cylinders but in order to simplify the drawing cylinders 22 and 23 have been shown as having opposite ends thereof closed by heads 26 and 27 which are common to all of the cylinders.

Liquid for operating the hydraulic jacks is supplied by a constant pressure pump P2 which is connected to opposite ends of cylinders 23 by branched channels 28 and 29, respectively. Pump P2 is the same as pump P1 except that it is smaller and it is provided with a pressure regulating screw 16a and two solenoids S1a and S2a which correspond to screw 16 and solenoids S1 and S2, respectively.

When solenoid S1a is energized, pump P2 will discharge liquid at a predetermined maximum rate through channel 29 into cylinders 23 and cause pistons 24 to advance crosshead 20, head 1 and ram 21 at high speed until head 1 engages pipe 2 which will cause pump pressure to rise until it reaches the maximum determined by screw 16a and then pump 2 will automatically reduce its displacement until it is discharging just enough liquid to maintain that maximum pressure constant. When solenoid S1a is de-energized and solenoid S2a is energized, pump P2 will deliver liquid at a predetermined rate through channel 29 to cylinders 23 and cause pistons 24 to retract crosshead 20, head 1 and ram 21 at high speed until solenoid S2 is de-energized and then pump P2 will reduce its displacement to zero.

Provision must be made for flow of liquid into and out of cylinder 22 during movement of ram 21 by jacks 23—25. As shown, a tank 35 containing a supply of liquid is connected to cylinder 22 through a prefill valve V2 of a well-known type which has been in extensive use for many years. Valve V2 has its body 36 mounted upon cylinder head 27 and provided with a port 37 which communicates with the interior of cylinder 22, a port 38 which is connected to tank 35 and a port 39 which is supplied with liquid at high pressure as will presently be explained.

Communication between the ports of valve V2 is controlled by a valve plunger 40 which is fitted in body 1 and provided intermediate its ends with a cannelure 41 which provides communication between port 39 and port 37 when plunger 40 is in its "closed" position as shown in Fig. 3, port 39 being blocked by plunger 40 when it is in its "open" position as shown in Fig. 1. Plunger 40 is adapted to be moved from one to the other of its two positions by a servo-motor comprising a cylinder 42 which is formed in body 36, a piston 43 which is fitted in cylinder 42 and a piston rod 44 which is fixed to piston 43 and is connected to plunger 40.

Liquid for energizing servo-motor 42—44 is supplied by pump P2. As shown, the outer end of cylinder 42 communicates with a channel 45 which is connected through a resistance valve 46 and a check valve 47 to channel 28 and the inner end of cylinder 42 is connected to channel 29 by a channel 48. Resistance valve 46 and check valve 47 have been shown separate from valve V2 in order to simplify the drawing but in practice they are built into a head which closes the end of cylinder 42 and also contains a choke (not shown) which limits the rate at which liquid can flow into or out of cylinder 42 and thereby limits the rate at which plunger 40 is moved by servo-motor 42—44.

Check valve 47 permits liquid to escape freely from the outer end of cylinder 42 but prevents flow of liquid into cylinder 42 except through resistance valve 46 which is adjusted to open at a pressure which is higher than the pressure required to enable jacks 23—25 to advance head 1 against the end of pipe 2 but is lower than the pressure at which pump P2 reduces its displacement.

The arrangement is such that, when pump P2 discharges liquid to channel 28, that liquid will first cause jacks 23—25 to advance head 1 and ram 21 will move with head 1 and will draw liquid into cylinder 22 through valve V2 from tank 35. Jacks 23—25 will continue to advance head 1 until it stalls against the end of pipe 2 which will cause pump pressure to rise until it is high enough to open resistance valve 46 and then liquid will flow therethrough and through channel 45 into cylinder 42 and cause piston 43 to move plunger 40 into its closed position as shown in Fig. 3 in which position it closes port 38, so that there is no communication between cylinder 22 and tank 35, and cannelure 41 establishes communication between ports 39 and 37 so that high pressure liquid can flow into cylinder 22 and raise the pressure therein to a high value as will presently be explained.

When pump P2 is reversed and discharges liquid into channel 29, the pressure created by pump P2 will cause jacks 23—25 to tend to retract head 1 but they cannot do so due to the high pressure in cylinder 22. Therefore, the pump pressure will tend to cause servo-motor 42—44 to open valve V2 when the pressure in cylinder 22 is high would permit the liquid in cylinder 22 to expand suddenly and create a violent shock, which is detrimental to the structure, and a resultant noise.

In order to avoid such shock and noise, the mechanism is preferably provided with a decompression valve V3 comprising a body 52 which is connected by a channel 53 to tank 35 and is provided with a port 54 which is connected by a channel 55 to the port 37 of valve V2, a valve plunger 56 which is fitted in body 52 and controls communication between channel 53 and port 54, and a spring 57 which is arranged in one end of body 52 and urges plunger 56 to its closed position as shown. The other end of body 52 has a branch of channel 48 connected thereto.

Plunger 56 is much smaller and lighter than the plunger 40 of valve V2 and it has its entire cross-sectional area subjected to pressure. Therefore, the pressure required to shift valve plunger 56 is much lower than the pressure required to enable servo-motor 42—44 to retract plunger 40. Consequently, when pump P2 starts to discharge liquid into channel 29, that liquid will at first flow through channels 29 and 48 to valve V3 and will shift its plunger 56 toward the right to uncover port 54. Then liquid can escape from cylinder 22 through valve V2, channel 55, valve V3 and channel 53 into tank 35. Only an instant is required for enough liquid to escape from cylinder 22 to drop the pressure therein to a value low enough to prevent a shock when valve V2 opens.

As soon as plunger 56 reaches the limit of its movement toward the right, pump pressure will rise and liquid will flow from channel 48 into cylinder 42 and cause piston 43 to retract plunger 42. As soon as piston 43 stalls against the end of cylinder 42, pump pressure will rise still higher and liquid will flow through channel 29 into cylinders 23 and cause pistons 24 to retract head 1 and ram 21 to expel liquid from cylinder 22 through valve V2 into tank 35.

High pressure port 39 in valve V2 is connected by a channel 58 to a branched channel 59 which is connected through one or more pressure reducing valves and one or more shut-off valves to a channel 60 which is connected to the high pressure side of pump P1 as by being connected to channel 14 so that the pressure of the liquid supplied to the reducing valve is always proportional to the pressure of the test water supplied to the pipe being tested.

Fig. 1 shows channel 59 connected to the outlets of three pressure reducing valves V4, V4ª, and V4ᵇ the inlets of which are connected, respectively, by channels 61, 61ª, and 61ᵇ to the outlets of three shut-off valves V5, V5ª, and V5ᵇ the inlets of which are connected to channel 60 but preferably there are as many pressure reducing valves and as many shut-off valves as there are different sizes of pipes to be tested unless ram 21 is made such a size that the ratio between its cross-sectional area and the cross-sectional area of the largest pipe to be tested is the same as the ratio between the piston 10 and the plunger 12 of the intensifier in which case one reducing valve may be omitted and channel 59 be connected to channel 60 through a shut-off valve V5ᶜ as indicated in Fig. 1.

The reducing valves may be of any suitable construction but have been indicated as being of the type illustrated diagrammatically in Fig. 2 in which valve V4 has been shown as including a small cylinder 65 having an outlet port 66 formed in the wall thereof, a small piston 67 which is fitted in cylinder 65 and normally blocks port 66, a large cylinder 68 which is fixed to and communicates with cylinder 65, a large piston 69 which is fitted in cylinder 68, means for transmitting motion from either piston to the other such as providing one piston with an integral stem which engages the other piston, and a light spring 70 which urges piston 69 toward the small cylinder 65. Cylinder 65 has channel 61 connected thereto to form the inlet thereof. One branch of channel 59 is connected to port 66 and another branch of channel 59 is connected to cylinder 68 preferably through a choked passage 71.

The several reducing valves differ from each other only in that the ratio between the cross-sectional areas of pistons 67 and 69 of each valve is different than the ratio between the cross-sectional areas of pistons 67 and 69 of any other valve. Pistons 67 and 69 are so proportioned as to reduce the pressure created by pump P1 to such a value that the liquid supplied to cylinder 22 will exert upon ram 21 a force which is approximately equal to the blow-off force exerted upon head 1 by the pressure in the pipe being tested.

The cross-sectional areas of the pistons of each valve is determined by the formula $$\frac{A}{B}=\frac{R}{P}\times\frac{D}{C}$$

in which A and B are the areas of pistons 69 and 67, respectively, R is the cross-sectional area of ram 21, P is the cross-sectional area of the pipe to be tested, and C and D are the cross-sectional areas of the piston 10 and the plunger 12, respectively, of intensifier 8. For example, if the intensifier ratio is 4:1 and the ratio between ram 21 and the pipe to be tested is 20:1, liquid should be supplied to cylinder 22 through a reducing valve having a ratio of 5:1 but if a pipe twice as large in diameter is to be tested, liquid should be supplied to cylinder 22 through a reducing valve having a ratio of 5:4.

When changing from one size of pipe to another, it is only necessary to close the shut-off valve connected in series with the reducing valve through which liquid had been supplied to cylinder 22 and to open the shut-off valve connected in series with the reducing valve which corresponds to the pipe to be tested and then that pipe can be tested at any pressure because the pressure at which liquid is supplied to the reducing valve is always proportional to the testing pressure. When it is desired to test pipes at a different pressure, it is only necessary to turn screw 16 which may be provided with a dial (not shown) which is calibrated to indicate the maximum pressure which pump P1 can create at any given adjustment of screw 16.

*Operation*

Assuming that pumps P1 and P2 are running at zero displacement, that valve V4 is the right size for the pipe to be tested and that the parts are in the positions indicated in Fig. 1 except that head 1 is retracted and there is no pipe in the testing machine, a cycle of operations would be substantially as follows:

The pipe 2 to be tested is inserted through sealing device 6ª and lined up with the opening through sealing device 6. Then solenoid S1ª is energized to cause pump P2 to deliver liquid to jacks 23—25 which will advance head 1 and pass sealing device 6 over the end of pipe 2. Head 1 will continue to advance until pipe 2 is pressed between abutments 5 and 5ª and ram 21 will advance with head 1 and will draw liquid into cylinder 22 through valve V2 from tank 35.

If the sealing devices 6 and 6ª are of the expandable type, they are closed upon pipe 2 after it is pressed between the heads and then valves V1 and V1ª are opened to fill pipe 2 with water. Pressing head 1 against pipe 2 causes the pressure created by pump P2 to rise and enable servo-motor 42—44 to move plunger 40 of valve V2 into its closed position as shown in Fig. 3.

After valve V2 is closed, the pump pressure will continue to rise until it reaches the maximum determined by screw 16ª and then pump P2 will automatically reduce its displacement until it is discharging just enough liquid to maintain that maximum pressure constant which will enable jacks 23—25 to urge head 1 against the pipe with a hold-up force which remains substantially constant.

After the pipe is filled with water, valves V1 and V1ª are closed and solenoid S1 is energized which will cause pump P1 to discharge liquid through channel 14 into intensifier 8 and through channel 60, valve V5, channel 61, valve V4, channels 59 and 58 and valve V2 into ram cylinder 22. The liquid delivered by pump P1 into intensifier 8 will cause it to discharge water through channel 13 and head 1 into the pipe and create pressure therein but at the same time the liquid delivered by pump P1 into cylinder 22 will create pressure therein.

The resistance to entry of water into pipe 2, which is already filled with water, causes the pressure created by pump P1 to rise until it reaches the maximum determined by the adjustment of screw 16 and then pump P1 will automatically reduce its displacement until it is discharging just enough liquid to maintain that pressure constant. For example, if pipe 2 is to be tested at 12,000 p.s.i. and intensifier 8 has a ratio of 4:1, the screw 16 will have previously been adjusted to limit the pressure created by pump P1 to 3,000 p.s.i. If pipe 2 is one of the smaller pipes and the ratio between the cross-sectional area of ram 21 and the cross-sectional area of pipe 2 is 20:1, the ratio between the cross-sectional area of the large and small piston of valve V4 will be 5:1 and valve V4 will reduce the pressure from 3,000 p.s.i. in channel 60 to 600 p.s.i. in cylinder 22.

The cross-sectional areas of commercial pipes and tubes are never in even inches but, assuming that in the above example pipe 2 has an area of 15 sq. in., the pressure in pipe 2 would exert a blow-off force of 90 tons which would tend to move head 1 away from pipe 2. With a ratio of 20:1 between ram 21 and the pipe, ram 21 would have an area of 300 sq. in. and the 600 p.s.i. acting thereon would enable ram 21 to exert upon head 1 a counterbalance force which is equal and opposite to the blow-off force. Since the blow-off force and the counterbalance force are both determined by the pressure created by pump P1, the two opposing forces are always substantially equal at all pressures from minimum to maximum during testing of any size of pipe at any testing pressure, and head 1 is firmly held against the ends of pipe 2 by the constant force exerted on head 1 by jacks 23—25.

It has previously been explained that the testing pressure causes the pipe being tested to expand radially and to shrink longitudinally. For example, a pipe 50 ft. long will shrink about .75" during the time that the testing pressure is being increased from a moderate pressure to a maximum of 12,000 p.s.i.

In an operating mechanism constructed according to the present invention, it is not necessary to provide any additional means for supplying liquid to the hydraulic means as the pipe shrinks in length because the liquid continuously supplied to cylinders 23 by pump P2 will advance head 1 as fast as pipe 2 shrinks and will continue to urge head 1 against pipe 2 with a constant force, and the liquid continuously supplied to cylinder 22 by pump P1 will keep cylinder 22 filled and will continue to exert upon ram 21 a counterbalance force which is substantially equal to the blow-off force exerted upon head 1 by the liquid in pipe 2.

*Figure 3*

The operating mechanism shown in this figure is the same as that shown in Fig. 1 except that channel 60 is connected to the outlet of intensifier 8 instead of being connected to the outlet of pump P1, shut-off valve V5ᶜ has been shown connected by a channel 61ᶜ to the inlet of a reducing valve V4ᶜ the outlet of which has a branch of channel 59 connected thereto, and the ratio between the cross-sectional areas of the large and small pistons of each pressure reducing valve is the same as the ratio between the cross-sectional area of piston 21 and the pipe to be tested when that pressure reducing valve is effective.

In this case tank 35 contains a supply of water instead of oil and ram 21 may be made much smaller because the pressure at the inlet of the effective pressure reducing valve is the same as the pressure in the pipe being tested. The mechanism functions in the same way as the mechanism shown in Fig. 1 but the counterbalance force is exerted upon ram 21 by water supplied from intensifier 8 instead of by oil supplied from pump P1.

The operating mechanism disclosed herein may be modified in various other ways without departing from the scope of the invention which is hereby claimed as follows:

1. Operating mechanism for a pipe testing machine having a normally stationary head and a movable head for supporting opposite ends of a pipe to be tested, means for sealing said pipe in both of said heads, means for prefilling said pipe with water, an intensifier having a pressure cylinder and an operating cylinder, means connecting said pressure cylinder to one of said heads in communication with the interior of said pipe, and means for supplying motive liquid to said operating cylinder to cause said intensifier to discharge water into said pipe at a testing pressure, a plurality of hydraulic jacks connected to said movable head for moving the same against said pipe and away from said pipe, a normally stationary ram cylinder, a ram arranged in said ram cylinder and connected to said movable head, means for prefilling said ram cylinder with liquid during movement of said head toward said pipe and for exhausting liquid from said ram cylinder during movement of said head away from said pipe, means for creating pressure in said ram cylinder after said movable head engages said pipe to enable said ram to exert upon said movable head a force in opposition to said blow-off force, a constant pressure pump connected to opposite ends of said jacks, means for causing said pump to deliver liquid to the head ends of said jacks and thereby enable said jacks to advance said movable head toward said pipe and to urge said head against the end of said pipe with a predetermined constant force, and means for causing said pump to deliver liquid to the rod ends of said jacks to enable said jacks to retract said head, and said prefill means including a prefill valve having means for closing it in response to said pump creating predetermined pressure in the head ends of said jacks and means for opening it in response to said pump creating pressure in the rod ends of said jacks.

2. Operating mechanism as set forth in claim 1 and including a normally closed decompression valve which is connected to said ram cylinder and opens in response to said pump creating in the rod ends of said jacks a predetermined pressure which is lower than the pressure required to open said prefill valve.

3. Operating mechanism for a pipe testing machine having a normally stationary head and a movable head for supporting opposite ends of a pipe to be tested, means for sealing said pipe in both of said heads, means for prefilling said pipe with water, an intensifier having a pressure cylinder and an operating cylinder, means connecting said pressure cylinder to one of said heads in communication with the interior of said pipe, and means for supplying motive liquid to said operating cylinder to cause said intensifier to discharge water into said pipe at a testing pressure, said test water exerting radial forces on said pipe to test the same and also exerting upon an area of said movable head a blow-off force which tends to move said movable head away from said pipe, said mechanism comprising a plurality of hydraulic jacks connected to said movable head, a constant pressure pump connected to opposite ends of said jacks, means for causing said pump to deliver liquid to the head ends of said jacks and thereby enable said jacks to advance said movable head toward said pipe and to urge said head against the end of said pipe with a predetermined constant force, means for causing said pump to deliver liquid to the rod ends of said jacks to enable said jacks to retract said head, a normally stationary ram cylinder, a ram arranged in said ram cylinder and connected to said movable head, a source of low pressure liquid connected to said ram cylinder, a first channel connected to said ram cylinder, valve means connected to said ram cylinder and operable to block communication between said ram cylinder and either said source or said channel, a pressure reducing valve having its outlet connected to said first channel, and a second channel connected to the inlet of said reducing valve for supplying liquid thereto at a pressure proportional to said testing pressure, said reducing valve being so constructed that it reduces the pressure in said first channel and in said ram cylinder to such a value that there is not a material difference between the force exerted upon said ram by the pressure in said ram cylinder and the blow-off force exerted upon said movable head by the pressure in said pipe.

4. Operating mechanism as set forth in claim 3 and in which a plurality of pressure reducing valves are connected between said first and second channels in parallel with each other, said valves are so constructed that the drop in pressure across each valve is different than the drop in pressure across any other one of said valves, and a shut-off valve is connected between each of said valves and said second channel.

5. Operating mechanism as set forth in claim 3 and in which said second channel is connected to the outlet of said intensifier.

6. Operating mechanism as set forth in claim 5 and in which said pressure reducing valve includes a small cylinder having an inlet to which said second channel is connected and an outlet to which said first channel is connected, a small piston fitted in said small cylinder and normally blocking said outlet, a large cylinder fixed to said small cylinder and having said outlet connected thereto, a large piston fitted in said large cylinder, means for transmitting motion from either of said pistons to the other piston, and the ratio between the pressure area of said large piston and the pressure area of said small piston is approximately the same as the ratio between the pressure area of said ram and the area of said head which is subjected to the pressure in said pipe.

7. Operating mechanism as set forth in claim 3 and including a decompression valve which is connected between said ram cylinder and said source and is operable to connect said cylinder to said source in response to said pump delivering liquid to the rod ends of said jacks.

8. Operating mechanism as set forth in claim 3 and in which said valve means is operable to block communication between said ram cylinder and said source and to connect said second channel to said ram cylinder in response to said pump creating pressure after said movable head stalls against said pipe and said valve means is operable to block communication between said ram cylinder and said second channel and to connect said ram cylinder to said source in response to said pump being reversed to effect retraction of said movable head.

9. Operating mechanism as set forth in claim 8 and including a decompression valve which is connected between said ram cylinder and said source and is operable to connect said cylinder to said tank in response to said pump delivering liquid to the rod ends of said jacks.

10. Operating mechanism for a pipe testing machine having a normally stationary head and a movable head for supporting opposite ends of a pipe to be tested, means for sealing said pipe in both of said heads, means for prefilling said pipe with water, an intensifier having a pressure cylinder and an operating cylinder, means connecting said pressure cylinder to one of said heads in communication with the interior of said pipe, and a first constant pressure pump connected to said operating cylinder for supplying liquid under pressure thereto to effect operation of said intensifier, said test water exerting radial forces on said pipe to test the same and also exerting upon an area of said movable head a blow-off force which tends to move said movable head away from said pipe, said mechanism comprising a plurality of hydraulic jacks connected to said movable head, a second constant pressure pump connected to opposite ends of said jacks, means for causing said second pump to deliver liquid to the head ends of said jacks and thereby enable said jacks to advance said movable head toward said pipe and to urge said head against the end of said pipe with a predetermined constant force, means for causing said second pump to deliver liquid to the rod ends of said jacks to enable said jacks to retract said head, a normally stationary ram cylinder, a ram arranged in said ram cylinder and connected to said movable head, a tank connected to said ram cylinder and containing a supply of liquid, a first channel connected to said ram cylinder, valve means connected to said ram cylinder and operable to block communication between said ram cylinder and either said tank or said channel, a pressure reducing valve having its outlet connected to said first channel, and a second channel connecting said first pump to the inlet of said reducing valve for supplying liquid thereto at a pressure proportional to said testing pressure, said reducing valve being so constructed that it reduces the pressure in said first channel and in said ram cylinder to such a value that there is not a material difference between the force exerted upon said ram by the pressure in said ram cylinder and the blow-off force exerted upon said movable head by the pressure in said pipe.

11. Operating mechanism as set forth in claim 10 and in which a plurality of pressure reducing valves are connected between said first and second channels in parallel with each other, said valves are so constructed that the drop in pressure across each valve is different than the drop in pressure across any other one of said valves, and a shut-off valve is connected between each of said valves and said second channel.

12. Operating mechanism as set forth in claim 10 and including a decompression valve which is connected between said ram cylinder and said tank and is operable to connect said cylinder to said source in response to said second pump delivering liquid to the rod ends of said jacks.

13. Operating mechanism as set forth in claim 10 and in which said valve means is operable to block communication between said ram cylinder and said tank and to connect said second channel to said ram cylinder in response to said pump creating pressure after said movable head stalls against said pipe and said valve means is operable to block communication between said ram cylinder and said second channel and to connect said ram cylinder to said tank in response to said pump being reversed to effect retraction of said movable head.

14. Operating mechanism as set forth in claim 13 and including a decompression valve which is connected between said ram cylinder and said source and is operable to connect said cylinder to said tank in response to said second pump delivering liquid to the rod ends of said jacks.

15. Operating mechanism as set forth in claim 10 and in which said intensifier includes a piston which is fitted in said operating cylinder and a plunger which is fixed to that piston and extends into said pressure cylinder, said reducing valve includes a small piston which controls communication between the inlet and the outlet of said reducing valve and is subjected to the pressure at said inlet and a large piston which is movable with said small piston and is subjected to the pressure at said outlet, and the ratio between the areas of said valve pistons is approximately that determined by the formula $$\frac{A}{B} = \frac{R}{P} \times \frac{D}{C}$$

in which A and B are the cross-sectional areas of said large and small pistons respectively, R and P are the cross-sectional areas of said ram and said pipe respectively, and C and D are the cross-sectional areas of the intensifier piston and plunger respectively.

References Cited in the file of this patent

UNITED STATES PATENTS

| | | |
|---|---|---|
| 2,231,807 | Hybarger | Feb. 11, 1941 |
| 2,522,927 | Camerota | Sept. 19, 1950 |
| 2,683,982 | Lassman et al. | July 20, 1954 |
| 2,725,743 | Reichl | Dec. 6, 1955 |